US009688218B2

(12) United States Patent
Makita et al.

(10) Patent No.: US 9,688,218 B2
(45) Date of Patent: Jun. 27, 2017

(54) FRAME MOLDING FOR VEHICLE DOOR (71) Applicant: SHIROKI CORPORATION, Kanagawa (JP)

(72) Inventors: Jun Makita, Kanagawa (JP); Takashi Kameyama, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/915,939

(22) PCT Filed: Aug. 27, 2014

(86) PCT No.: PCT/JP2014/072490
§ 371 (c)(1),
(2) Date: Mar. 2, 2016

(87) PCT Pub. No.: WO2015/033843
PCT Pub. Date: Mar. 12, 2015

(65) Prior Publication Data
US 2016/0200266 A1    Jul. 14, 2016

(30) Foreign Application Priority Data

Sep. 3, 2013 (JP) ................. 2013-181934

(51) Int. Cl.
*B60J 5/04* (2006.01)
*B60R 13/04* (2006.01)
(52) U.S. Cl.
CPC ........... *B60R 13/043* (2013.01); *B60J 5/0411* (2013.01); *B60R 13/04* (2013.01)

(58) Field of Classification Search
CPC ....... B60R 13/043; B60R 13/04; B60J 5/0411
See application file for complete search history.

(56) References Cited

U.S. PATENT DOCUMENTS

| 8,033,587 | B2 | 10/2011 | Yanai |
| 8,226,143 | B2 | 7/2012 | Takeuchi et al. |
| 8,408,622 | B2 | 4/2013 | Yanai et al. |
| 9,096,187 | B2 * | 8/2015 | Kawano ................. B60R 13/04 |

(Continued)

FOREIGN PATENT DOCUMENTS

| JP | 2007-062399 A | 3/2007 |
| JP | 2009132240 A | 6/2009 |

(Continued)

OTHER PUBLICATIONS

International Search Report and Written Opinion from PCT/JP2014/072490 dated Oct. 7, 2014.

*Primary Examiner* — Justin Rephann
(74) *Attorney, Agent, or Firm* — Millen, White, Zelano & Branigan, P.C.; William Nixon (57) ABSTRACT

A frame molding for a vehicle door includes a first molding portion which is connected to a sash molding attached to a door sash, a second molding portion which is connected to a belt molding, which is attached to an upper edge of a door panel, and a corner portion at which the first molding portion and the second molding portion meet. The frame molding includes, at the corner portion, a corner engaging portion which is engaged with the door panel to restrict at least upward movement of the corner portion. This makes it possible to improve the stability of support for the frame molding.

13 Claims, 9 Drawing Sheets

(56) References Cited

U.S. PATENT DOCUMENTS

| | | | |
|---|---|---|---|
| 2010/0064591 A1* | 3/2010 | Iwabuchi | B60R 13/04 49/499.1 |
| 2010/0181798 A1 | 7/2010 | Takeuchi et al. | |
| 2011/0163563 A1 | 7/2011 | Yanai | |
| 2011/0187141 A1 | 8/2011 | Yanai et al. | |
| 2014/0292012 A1* | 10/2014 | Yoshida | B60J 10/085 296/1.08 |
| 2015/0203055 A1* | 7/2015 | Goto | B60R 13/04 52/716.5 |
| 2016/0221421 A1* | 8/2016 | Makita | B60R 13/04 |

FOREIGN PATENT DOCUMENTS

| | | |
|---|---|---|
| JP | 4645367 B | 12/2010 |
| JP | 2013-154747 A | 8/2013 |
| WO | 2010032662 A1 | 3/2010 |
| WO | 2010035645 A1 | 4/2010 |

* cited by examiner

Fig.9

FRAME MOLDING FOR VEHICLE DOOR

TECHNICAL FIELD

The present invention relates to a frame molding which is attached to a corner portion of a door sash of a vehicle door.

BACKGROUND ART

Sash moldings and belt moldings are attached, as edge trims for door sashes and door panels, to vehicle doors. In addition, vehicle doors in which a frame molding, which is connected to a sash molding and a belt molding, is attached to the corner portion at the front end or rear end of the door sash are also known in the art.

CITATION LIST

Patent Literature

Patent Literature 1: Japanese Patent Publication No. 4,645,367

SUMMARY OF THE INVENTION

Technical Problem

The frame molding is in the shape of a letter V with a first molding portion that is connected to the sash molding (an upper sash molding extending along an upper sash) and a second molding portion that is connected to the belt molding meeting at the corner portion of the V-shaped frame molding. The second molding portion of the frame molding is attached to the upper edge of a door panel via clips; however, there is a possibility of the frame molding tilting in such a way as to cause the corner portion of the frame molding to be loosened upwardly, with the clips as fulcrums, upon a load being applied to the frame molding in such a way as to lift the frame molding upwardly. In this case, the sealing property between the frame molding and the door panel is impaired, which causes wind noise during driving and allows foreign particles to easily enter inside the door panel.

The present invention has been devised in view of the above described problems, and an object of the present invention is to provide a frame molding which is superior in stability of support for the frame molding with respect to the door panel.

Solution to Problem

In a frame molding which includes a first molding portion, a second molding portion and a corner portion, at which the first molding portion and the second molding portion meet, wherein the first molding portion is connected to a sash molding that is attached to a door sash and the second molding portion is connected to a belt molding that is attached to an upper edge of a door panel, the present invention is characterized by the frame molding being provided at the corner portion with a corner engaging portion which is engaged with the door panel to restrict at least upward movement of the corner portion.

It is desirable for the corner engaging portion of the frame molding to be structured, in a state of being engaged with the door panel, to restrict not only upward movement of the corner portion with respect to the door panel but also movement of the corner portion in a door thickness direction with respect to said door panel.

It is desirable for the corner engaging portion to include a hook which is engaged with an engaging hole formed in a support flange, which projects upward from the upper edge of the door panel.

With respect to the door panel that is formed of a combination of an inner panel which is positioned on the vehicle interior side and an outer panel which is positioned on the vehicle exterior side, the corner engaging portion of the frame molding can be engaged with either the outer panel or the inner panel; however, as an example, the corner engaging portion of the frame molding can be engaged with the outer panel.

It is desirable for the frame molding to be formed of a combination of a design member which includes a design portion facing toward a vehicle exterior and a holder portion which holds a weather strip along the door sash, and wherein the corner engaging portion is provided on the holder member.

This structure is effective especially in the case where the design portion is made of metal, and wherein at least the corner engaging portion of the holder member is made of synthetic resin. Additionally, it is desirable for the design member to have a length from an end of the first molding portion to an end of the second molding portion, and for a length of the holder member to extend from the end of the first molding portion to a middle portion of the second molding portion.

Advantageous Effects of the Invention

According to the present invention described above, the corner portion of the frame molding can be reliably supported on the door panel, which makes it possible to prevent problems that may be caused by a failure in supporting the frame molding from occurring.

DESCRIPTION OF EMBODIMENT

Figure 1:
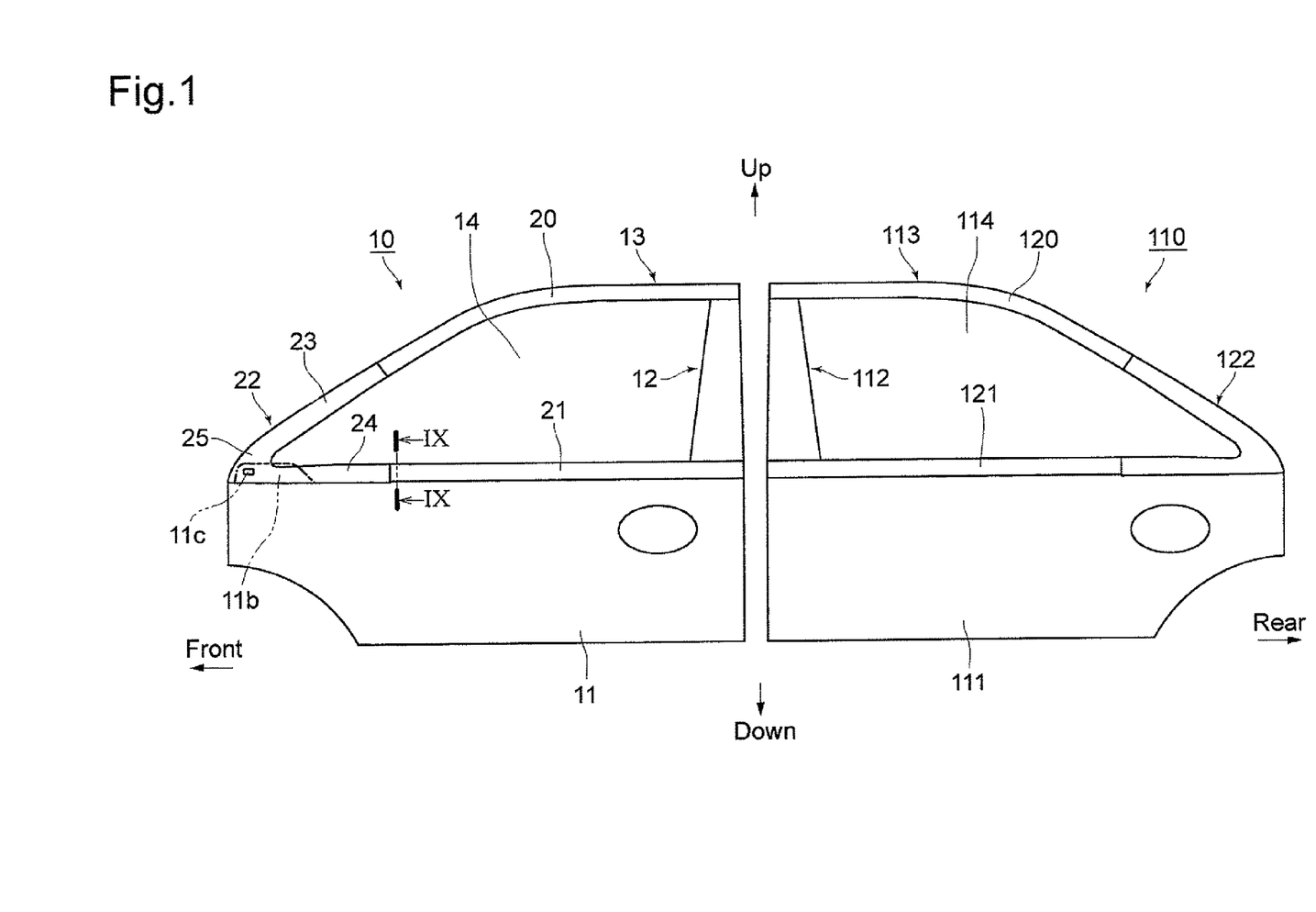
FIG. 1 is a side elevational view of a front side door and a rear side door of a vehicle that are provided with a frame molding to which the present invention has been applied.

FIG. 1 shows a front side door 10 and a rear side door 110 which are equipped with a frame molding to which the present invention has been applied. Terms indicating a direction such as forward, rearward, upward, downward, vehicle interior side and vehicle exterior side will be mentioned in the following descriptions to designate directions determined with reference to the vehicle body, to which the front side door 10 and the rear side door 110 are attached.

The front side door 10 is configured so that a frame-like door sash is provided on top of a door panel 11. The door sash is provided with a side sash (upright pillar sash) 12 which is supported by the rear of the door panel 11 and extends in the upward and downward directions, and an upper sash 13 which extends forward from the upper end of the side sash 12. A door glass (not shown in the drawings) moves up and down within a window opening 14 which is surrounded by the upper edge of the door panel 11, the side sash 12 and the upper sash 13. The door panel 11 is formed of a combination of an inner panel that is positioned on the vehicle interior side and an outer panel 11N (FIGS. 4 through 6) that is positioned on the vehicle exterior side.

As decorative members for the front side door 10, an upper sash molding 20 and a belt molding 21 are attached to and along the upper sash 13 and the upper edge of the door panel 11, respectively. In addition, a front frame molding 22 which is connected to each of the upper sash molding 20 and the belt molding 21 is attached to the corner portion at the front end of the door sash.

The rear side door 110 is structured so that the rear side door 110 and the front side door 10 are substantially symmetrical to each other with respect to the forward and rearward directions. Namely, the rear side door 110 is provided with a side sash (upright pillar sash) 112 which is supported by the front of a door panel 111 and extends in the upward and downward directions, and an upper sash 113 which extends rearward from the upper end of the side sash 112. A door glass (not shown in the drawings) moves up and down within a window opening 114 which is surrounded by the upper edge of the door panel 111, the side sash 112 and the upper sash 113. The door panel 111 is formed of a combination of an inner panel that is positioned on the vehicle interior side and an outer panel that is positioned on the vehicle exterior side.

As decorative members for the rear side door 110, an upper sash molding 120 and a belt molding 121 are attached to and along the upper sash 113 and the upper edge of the door panel 111, respectively. In addition, a rear frame molding 122 which is connected to each of the upper sash molding 120 and the belt molding 121 is attached to the corner portion at the rear end of the door sash.

The details of the front frame molding 22 of the front side door 10 will be hereinafter discussed. The following descriptions also hold for the rear frame molding 122 of the rear side door 110 by reversing the positional relationship in the forward and rearward directions. Namely, the present invention is not limited to the front side door 10 and can also be applied to the rear side door 110.

Figure 2:
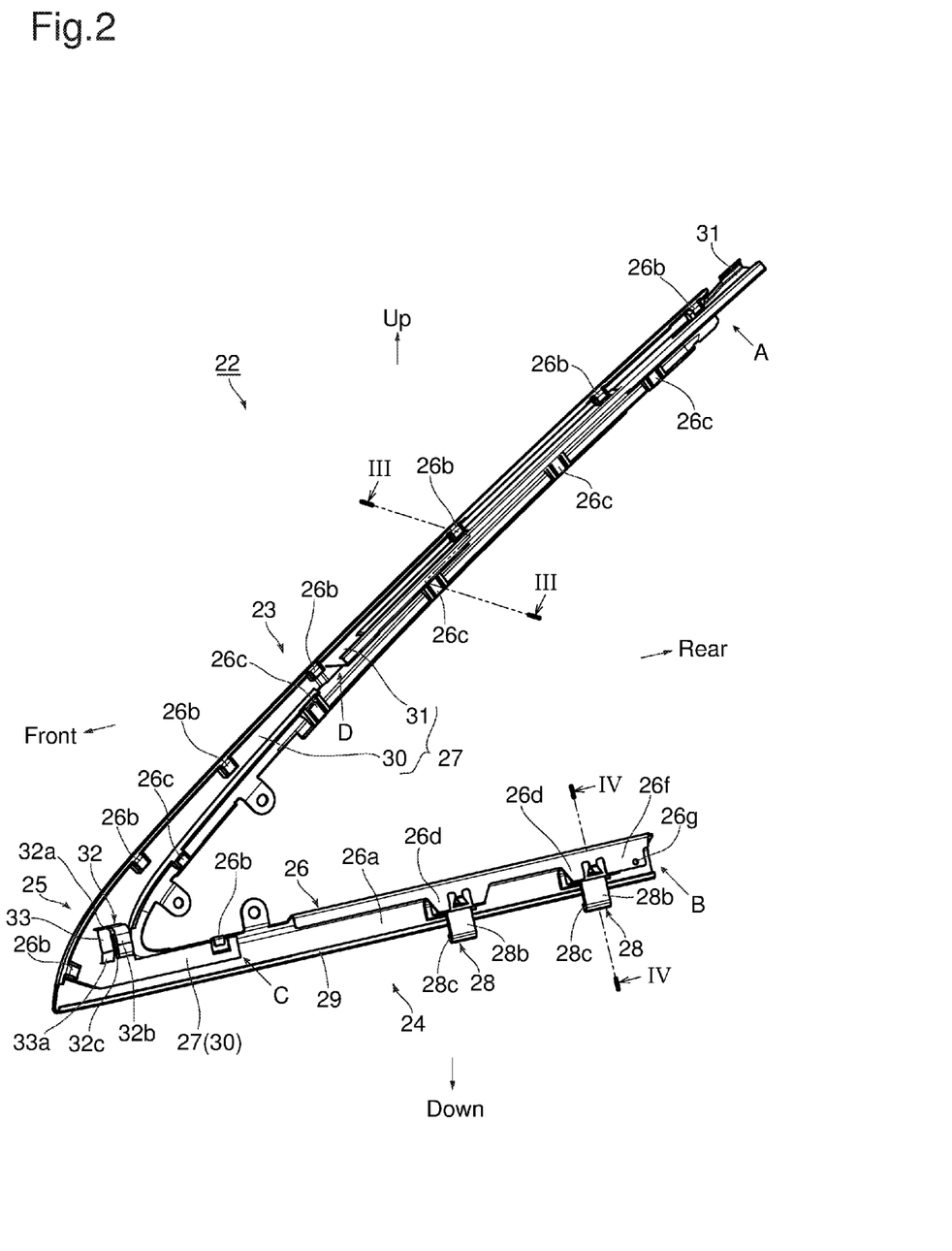
FIG. 2 is a perspective view of the front frame molding for the front side door, viewed from the vehicle interior side.

As shown in FIG. 2, the front frame molding 22 is provided with a first molding portion 23 which is shaped to be continuous with the upper sash molding 20, a second molding portion 24 which is shaped to be continuous with the belt molding 21, and a corner portion 25 at which the first molding portion 23 and the second molding portion 24 meet, thereby having the shape of a letter V. The front frame molding 22 is formed of a combination of a design member 26 and a holder member 27. In the second molding portion 24, a pair of clips 28 are fitted to the design member 26.

Figure 6:
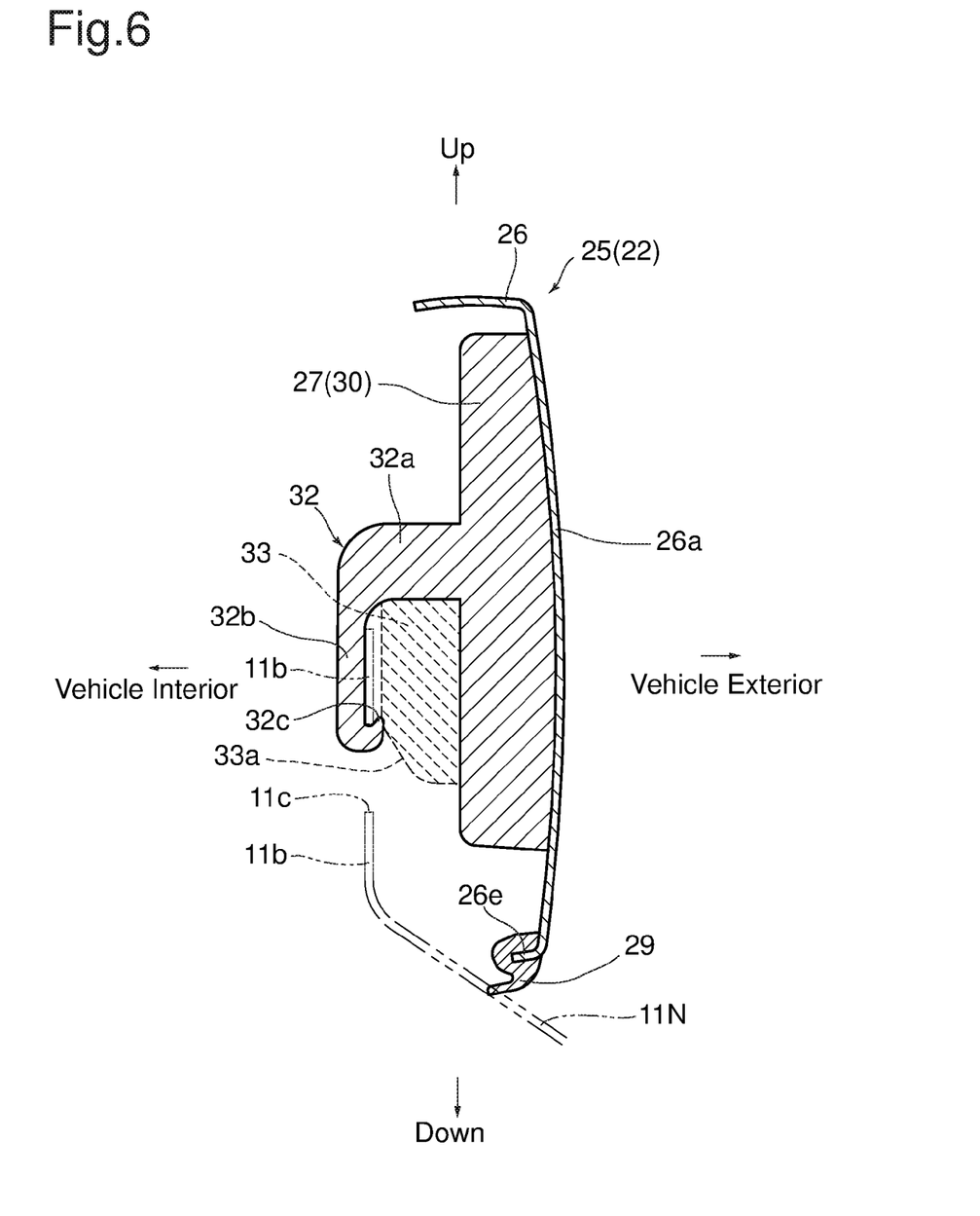
FIG. 6 is a cross sectional view of a portion where an engaging hook provided at the corner portion of the front frame molding and the door panel are mutually engaged, taken along the line VI-VI line shown in FIG. 5.

The design member 26 is shaped to extend along the entire front frame molding 22, ranging from the end (the position A shown in FIG. 2) of the first molding portion 23 to the end (the position B shown in FIG. 2) of the second molding portion 24, and is formed of metal such as a stainless steel by press forming. Although cross sectional shapes of the design member 26 taken at different positions of front frame molding 22 are mutually different as shown in FIGS. 3, 4 and 6, the external portion of the design member 26 that is positioned on the vehicle exterior side is formed of a design portion 26a as a basic structure, and the holder member 27 and the clips 28 are fitted to the vehicle interior side of the design portion 26a.

Figure 3:
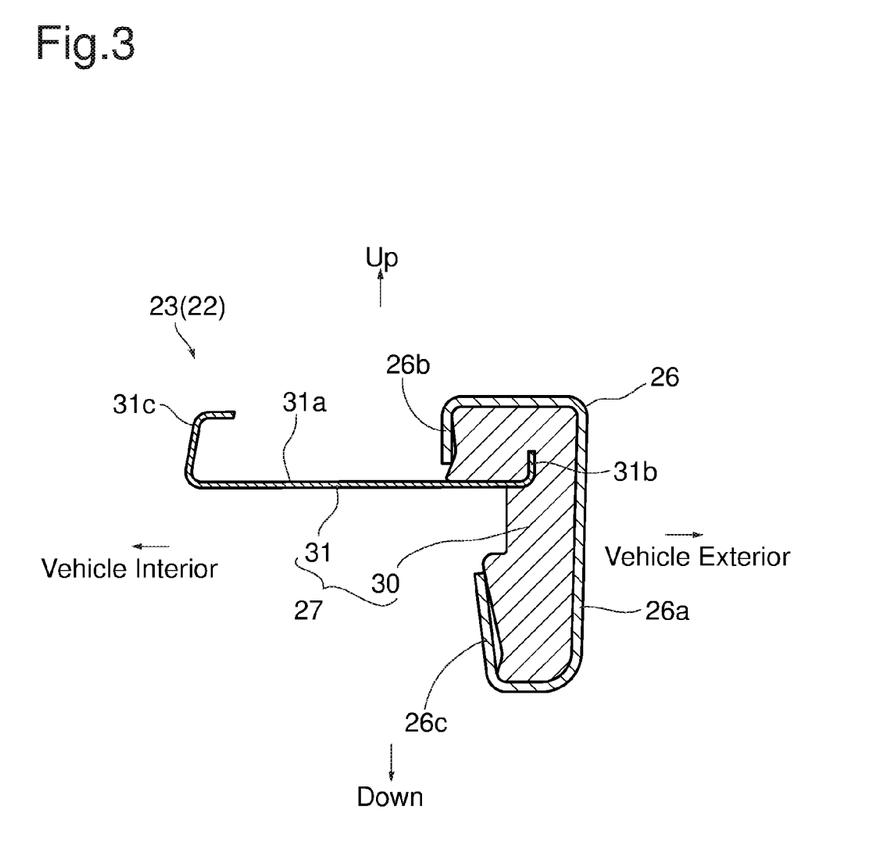
FIG. 3 is a cross sectional view of the first molding portion of the front frame molding, taken along the line III-III shown in FIG. 2.
Figure 4:
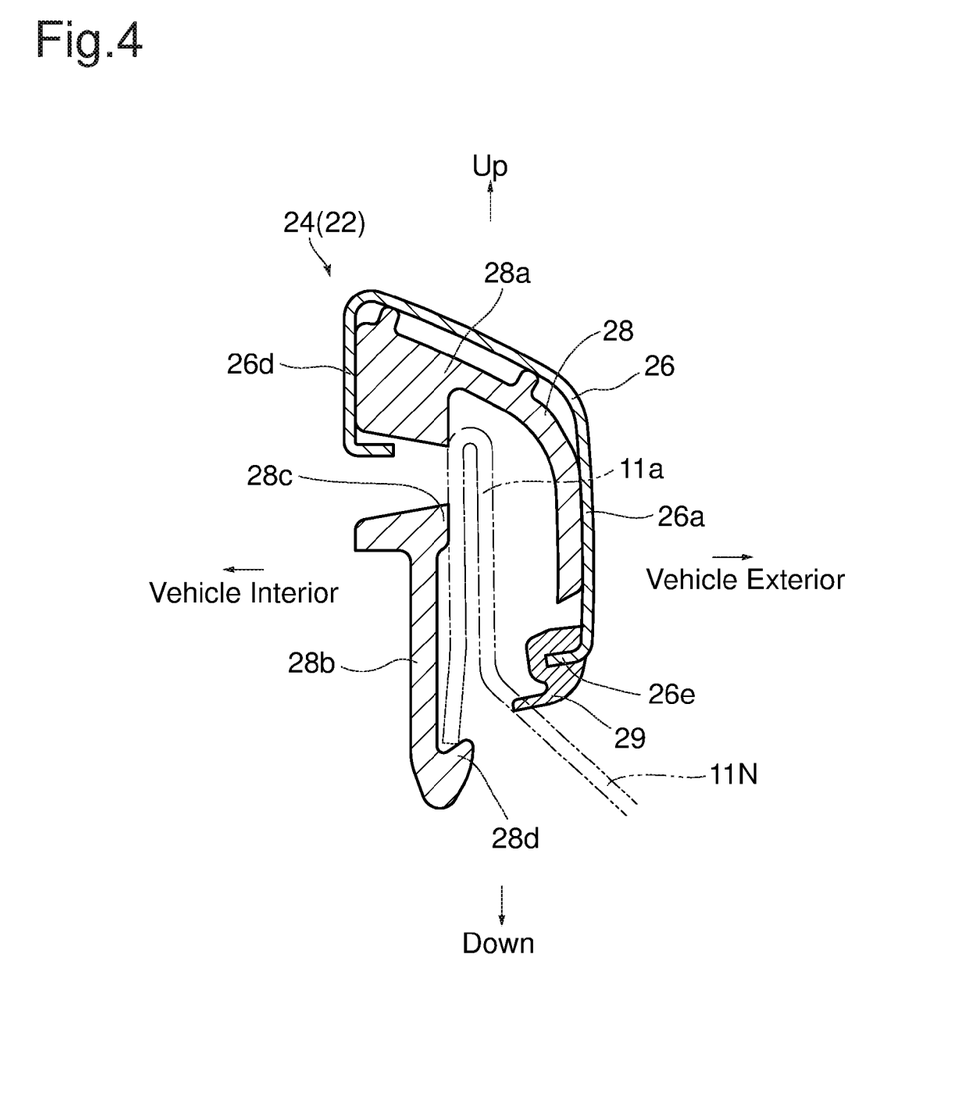
FIG. 4 is a cross sectional view of a portion where a clip provided on the second molding portion of the front frame molding and a door panel are mutually engaged, taken along the line IV-IV shown in FIG. 2.

As shown in FIGS. 2 and 3, a plurality of holding lugs 26b and a plurality of holding lugs 26c are formed on the design member 26 at different positions in the lengthwise direction thereof. The holding lugs 26b and 26c project toward the vehicle interior from either edge of the design portion 26a and are shaped as hooks bent in directions to approach each other. More than one holding lug 26b and more than one holding lug 26c are arranged on the first molding portion 23 at predetermined intervals in the lengthwise direction of the first molding portion 23, and only one holding lug 26b is provided on the second molding portion 24 in the vicinity of the corner portion 25. As shown in FIG. 4, the second molding portion 24 is provided, at portions thereof to which the pair of clips 28 are fitted, with clip holding portions 26d which are shaped to bend downward after projecting toward the vehicle interior from the upper edge of the design portion 26a, and the design portion 26a and the clip holding portion 26d form an inverted U-shaped cross-sectional portion which is open downward. In addition, a lip supporting portion 26e projects toward the vehicle interior from the lower edge of the design portion 26a along the entire the second molding portion 24. A body touch lip 29 is provided along the lip supporting portion 26e. The body touch lip 29 is made of an elastically deformable material and serves as a sealing portion which comes into contact with the outer panel 11N, which constitutes part of the door panel 11, when the front frame molding 22 is attached to the door panel 11 (see FIGS. 4 and 6).

The holder member 27 is a single-piece member which is configured of a resin holder portion 30 made of synthetic resin and a metal holder portion 31 made of metal such as a stainless steel which are integrally formed by insert molding. The resin holder portion 30 has a length from the end (the position A shown in FIG. 2) of the first molding portion 23 to a middle portion (the position C shown in FIG. 2) of the second molding portion 24 via the corner portion 25, and the resin holder portion 30 is inserted into the space surrounded by the design portion 26a, the holding lugs 26b and the holding lugs 26c to be connected to the design member 26 as shown in FIG. 3. As shown in FIG. 3, the metal holder portion 31 is a channel member having a U-shaped cross section and is provided with a flange 31b and a holding hook 31c which are made by bending both sides of a bottom portion 31a of the metal holder portion 31. The length of the metal holder portion 31 extends from the end (the position A shown in FIG. 2) of the first molding portion 23 to a middle portion (the position D shown in FIG. 2) of the first molding portion 23, and the resin holder portion 30 and the metal holder portion 31 are integrated with the flange 31b embedded in the resin holder portion 30.

The end (the position A shown in FIG. 2) of the first molding portion 23 of the front frame molding 22 is inserted into an end of the upper sash molding 20 to be connected thereto. Although the detailed shape of the upper sash molding 20 is omitted in the drawings, a holder portion having a cross sectional shape continuous with the metal holder portion 31 is formed on the upper sash molding 20, and a weather strip (not shown in the drawings) is held by this holder portion and the metal holder portion 31. The weather strip is provided with an elastic contact portion which projects in an outer peripheral direction of the door sash, and the elastic contact portion of the weather strip comes into contact with the vehicle body and is elastically deformed when the front side door 10 is closed, thereby preventing droplets of water, etc., from entering the inside of the vehicle.

The capability of the holder member 27 to hold a weather strip is sufficient if the holder member 27 has as much length as that of the metal holder 31 (i.e., the length from the position A to the position D shown in FIG. 2). However, the resin holder portion 30 is greater in length than the metal holder portion 31 and is formed to extend to a middle portion (the position C shown in FIG. 2) of the second molding portion 24 via the corner portion 25. This formation of the resin holder portion 30 so that it extends to the second molding portion 24 improves the strength of a portion of the front frame molding 22 around the corner portion 25. In addition, the resin holder portion 30 is also used as a portion to form an engaging hook 32 and a guide protrusion 33 at the corner portion 25 that will be discussed later.

As shown in FIG. 4, on the second molding portion 24 of the front frame molding 22, the pair of clips 28 are held at an area surrounded by the design portion 26a and the clip holding portions 26d of the design member 26. Each clip 28 is provided with a support body portion 28a which is fit-engaged with the inside of the design portion 26a and the associated clip holding portion 26d, and a downward extending portion 28b which is positioned on the vehicle interior side and projects downward, thereby having an inverted-U-shaped cross sectional shape. A planar abutting portion 28c which faces toward the vehicle exterior is formed at the top of the downward extending portion 28b, and a claw portion 28d which projects toward the vehicle exterior is formed at the lower end of the downward extending portion 28b.

When the front frame molding 22 is attached to the door panel 11, a flange portion 11a of the outer panel 11N is inserted in between the support body portions 28a and the downward extending portions 28b of the clips 28. The flange portion 11a is formed by folding the upper edge of the outer panel 11N toward the vehicle interior from the vehicle exterior side. The downward extending portions 28b of the clips 28 are resiliently deformable in the door thickness direction and are resiliently deformed toward the vehicle interior when the flange portion 11a is inserted. Upon the flange portion 11a being inserted up to the position shown in FIG. 4, the claw portion 28d engages with the end of the folded portion of the flange portion 11a that is folded toward the vehicle interior due to a restoring force which urges the downward extending portion 28b to cancel the resilient deformation thereof. This engagement creates a retaining state in which the clips 28 (the second molding portion 24) are prevented from moving upward with respect to the door panel 11. In addition, the positions of the clips 28 are fixed in the door thickness direction by the engagement of the abutting portions 28c with the flange portion 11a from the vehicle interior side and the engagement of the body touch clip 29 with a surface of the outer panel 11N on the vehicle exterior side.

Figure 5:
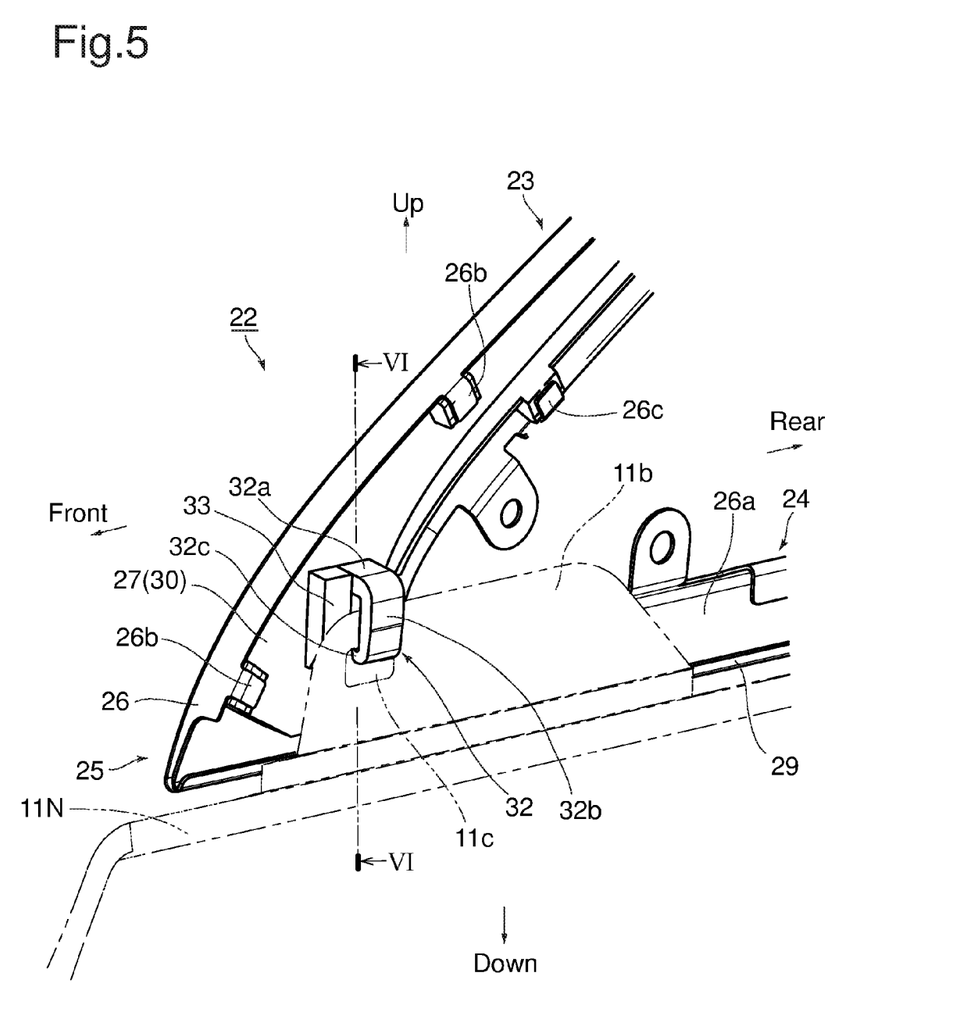
FIG. 5 is a perspective view of a portion where the corner portion of the front frame molding and the door panel are mutually engaged, viewed from the vehicle interior side.

The front frame molding 22 is further provided also at the corner portion 25 with an engaging portion which is engaged with the door panel 11. As shown in FIG. 5, the outer panel 11N is provided, on the upper edge of the outer panel 11N in the vicinity of the front end thereof, with a support flange 11b in the shape of a plate which projects upward, and an engaging hole 11c extending through the support flange 11b between the vehicle exterior side and the vehicle interior side. The support flange 11b has a greater upward projecting amount than that of the flange portion 11a and is offset toward the vehicle interior with respect to the flange portion 11a. In a state where the front frame molding 22 is attached to the door panel 11, the support flange 11b is positioned to face the vehicle interior side of the corner portion 25 (FIGS. 5 and 6). The resin holder portion 30, which constitutes a portion of the holder member 27 of the front frame molding 22, is provided with an engaging hook (corner engaging portion) 32 which is formed on a surface of the corner portion 25 on the vehicle interior side. As shown in FIG. 6, the engaging hook 32 is provided with a projecting portion 32a which projects toward the vehicle interior, a downward extending portion 32b which is bent downward from the projecting portion 32a and a claw portion 32c which is formed by bending the end of the downward extending portion 32b toward the vehicle exterior. The resin holder portion 30 is further provided at the front of the engaging hook 32 with a guide protrusion 33. As shown in FIG. 6, the guide protrusion 33 is provided with a guide surface 33a which is inclined toward the vehicle exterior side from the vehicle interior side with respect to a direction from up to down. The vehicle interior side surface of the guide protrusion 33 that is continuous with the guide surface 33a is positioned closer to the vehicle exterior side than the vehicle exterior side surface of the downward extending portion 32b of the engaging hook 32.

When the front frame molding 22 is attached to the door panel 11, the support flange 11b of the outer panel 11N is inserted in between the downward extending portion 32b of the engaging hook 32 and the guide protrusion 33. At this time, the guide surface 33a of the guide protrusion 33 makes smooth insertion of the support flange 11b possible. The downward extending portion 32b of the engaging hook 32 is resiliently deformable in the door thickness direction, and the downward extending portion 32b is resiliently deformed toward the vehicle interior when the support flange 11b is inserted. Upon the support flange 11b being inserted up to the position shown in FIG. 6, the claw portion 32c engages with the upper edge of the engaging hole 11c due to a restoring force which urges the downward extending portion 32b to cancel the resilient deformation thereof. This engagement creates a retaining state in which the engaging hook 32 (the corner portion 25) is prevented from moving upward with respect to the door panel 11. In addition, the position of the engaging hook 32 (the corner portion 25) is also determined in the door thickness direction by the downward extending portion 32b facing the vehicle interior side surface of the support flange 11b and the guide protrusion 33 facing the vehicle exterior side surface of the support flange 11b.

As described above, the second molding portion 24 of the front frame molding 22 is supported by the door panel 11 via the clips 28, and the corner portion 25 of the front frame molding 22 is supported by the door panel 11 via the engaging hook 32; hence, the front frame molding 22 can be attached onto door panel 11 with high precision along the entire front frame molding 22 in the forward and rearward directions. Specifically, the formation of the engaging hook 32, which is engaged with the door panel 11, at the corner portion 25 prevents the corner portion 25 from being loosened upwardly with the engaging points between the clips 28 and the flange portion 11a as fulcrums, thus enabling the entirety of the body touch lip 29 to come in contact with the door panel 11 with stability. This prevents wind noise from occurring between the front frame molding 22 and the door panel 11 and also prevents the sealing property between the front frame molding 22 and the door panel 11 from being impaired.

Figure 7:
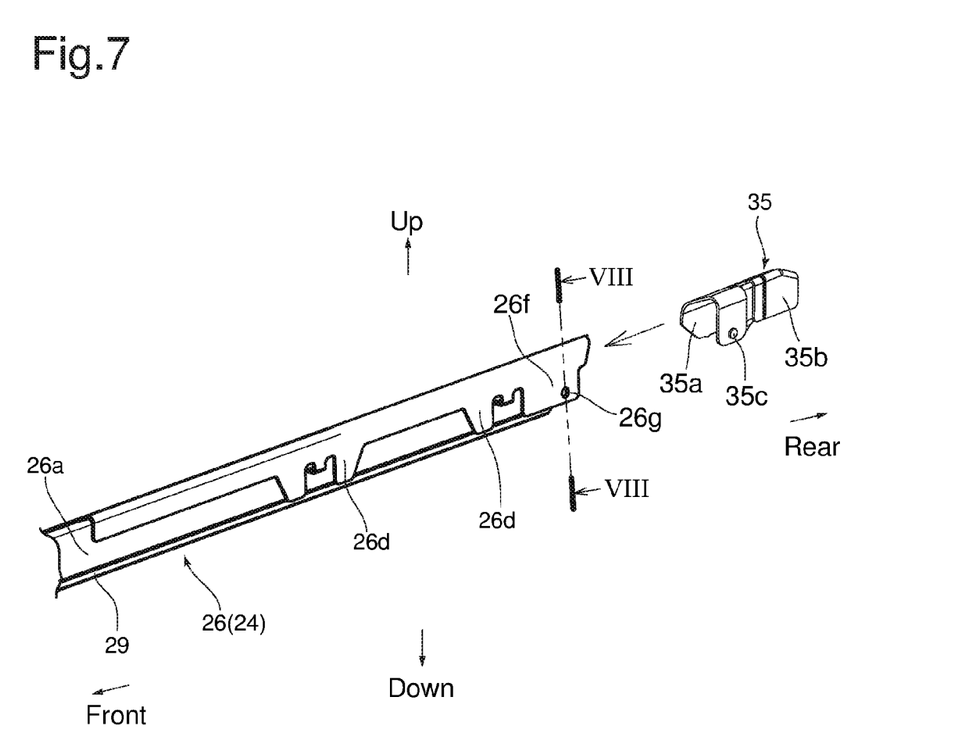
FIG. 7 is an exploded perspective view, illustrating the relationship between the second molding portion of the front frame molding and a molding bracket, viewed from the vehicle interior side.
Figure 8:
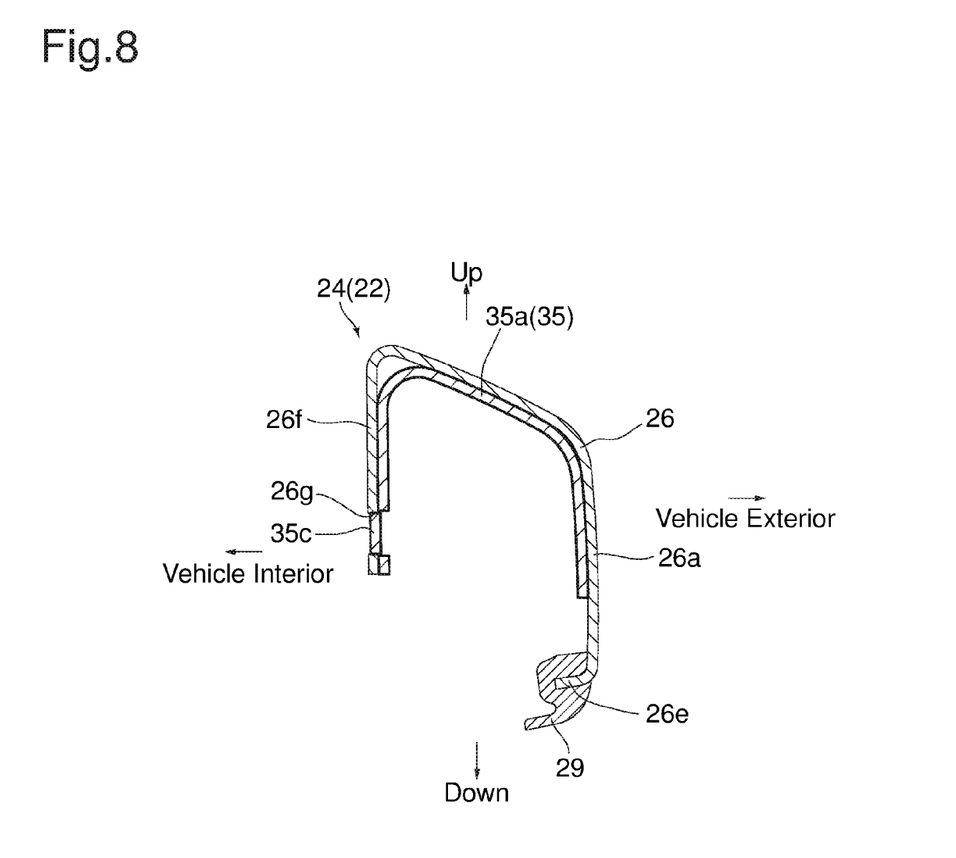
FIG. 8 is a cross sectional view of the second molding portion with the molding bracket attached thereto, taken along the line VIII-VIII shown in FIG. 7.
Figure 9:
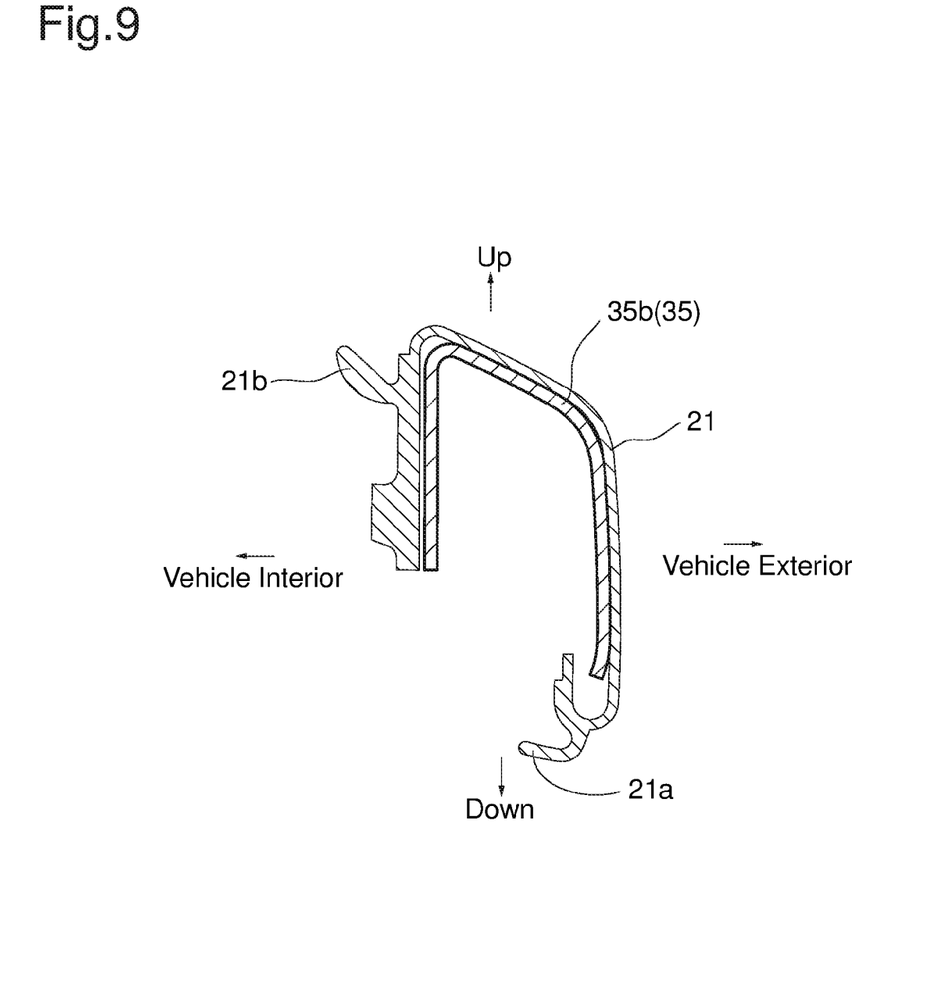
FIG. 9 is a cross sectional view of a belt molding with the molding bracket attached thereto, taken along the line IX-IX shown in FIG. 1.

The end (the position B shown in FIG. 2) of the second molding portion 24 of the front frame molding 22 is connected to the front end of the belt molding 21 via a molding bracket 35 shown in FIGS. 7 through 9. The second molding portion 24 is provided at an end thereof with a bracket holding portion 26f which is formed to be continuous with the clip holding portion 26d. Similar to the clip holding portions 26d, the bracket holding portion 26f is shaped to bend downward after projecting toward the vehicle interior from the upper edge of the design portion 26a, and the design portion 26a and the bracket holding portion 26f form an inverted U-shaped cross-sectional portion which is open downward. A positioning hole 26g is formed through the vehicle interior side wall of the bracket holding portion 26f that faces the design portion 26a.

As shown in FIG. 9, the belt molding 21 has an inverted U-shaped cross sectional shape which substantially corresponds to that of the end of the second molding portion 24 of the front frame molding 22; additionally, the belt molding 21 is provided on the vehicle exterior side with a body touch lip 21a which comes into contact with the outer panel 11N, similar to the body touch lip 29 of the front frame molding 22, and is provided on the vehicle interior side with a glass touch lip 21b which comes in contact with the door glass.

The molding bracket 35 is provided with a front insertion portion 35a which is insertable into the end (the inside of (between) the bracket holding portion 26f and the design portion 26a) of the second molding portion 24 of the front frame molding 22, and a rear insertion portion 35b which is insertable into the front end of the belt molding 21. As can be seen from FIGS. 8 and 9, each of the front insertion portion 35a and the rear insertion portion 35b has an inverted-U-shaped cross sectional shape which is open downward and is lightly press-fitted into the second molding portion 24 and the belt molding 21. The molding bracket 35 is provided on the vehicle interior side surface of the front insertion portion 35a with a positioning projection 35c which is engaged in the positioning hole 26g of the front frame molding 22. Positioning the front frame molding 22 and the bracket 35 by the engagement between the positioning hole 26g and the positioning projection 35c makes it possible to connect the belt molding 21 and the front frame molding to each other easily with high precision.

Although the present invention has been described based on the above illustrated embodiment, the present invention is not limited solely to this particular embodiment; various modifications to the above illustrated embodiment is possible without departing the gist of the present invention. As discussed above, the present invention is not limited to the support structure for the front frame molding 22 of the front side door 10 and can also be applied to the support structure for the rear frame molding 122 of the rear side door 110.

Although the engaging hook 32 of the front frame molding 22 is engaged with the outer panel 11N of the door panel 11 in the above illustrated embodiment, it is also possible to select an inner panel as an object which is to be engaged with the engaging hook 32.

Although the front frame molding 22 is formed of a combination of a design member 26, which is made of metal, and a holder portion 27, which is configured of the resin holder portion 30 and the metal holder portion 31, in the above illustrated embodiment, the structure of the frame molding to which present invention is applicable is not limited to this specific structure. It is desirable that the corner engaging portion, which is provided at the corner portion of the frame molding, be made of a non-metallic material such as synthetic resin due to the corner engaging portion being made to engage with a metal door panel; however, portions of the frame molding other than the corner engaging portion thereof can take an arbitrary structure and be made of an arbitrary material. For instance, the present invention can also be applied to a type of frame molding totally made of synthetic resin.

INDUSTRIAL APPLICABILITY

As described above in detail, in the present invention, a frame molding for a vehicle door is provided, including a first molding portion which is connected to a sash molding attached to a door sash, a second molding portion which is connected to a belt molding, which is attached to an upper edge of a door panel, and a corner portion at which the first molding portion and the second molding portion meet. The frame molding includes, at the corner portion, a corner engaging portion which is engaged with the door panel to restrict at least upward movement of the corner portion.

This makes it possible to improve the stability of support for the frame molding with respect to the door panel to provide a high-quality vehicle door.

REFERENCE SIGN LIST

10 Front side door
11 Door panel
11a Flange portion
11b Support flange
11c Engaging hole
11N Outer panel
12 Side sash
13 Upper sash
14 Window opening
20 Outer sash molding
21 Belt molding
21a Body touch lip
21b Pane touch lip
22 Front frame molding
23 First molding portion
24 Second molding portion
25 Corner portion
26 Design member
26a Design portion
26b 26c Holding lug
26d Clip holding portion
26e Lip supporting portion
26f Bracket holding portion
26g Positioning hole
27 Holder member
28 Clip
28a Support body portion
28b Downward extending portion
28c Abutting portion 28d Claw portion
29 Body touch lip
30 Resin holder portion
31 Metal holder portion
31a Bottom portion
31b Flange
31c Holding hook
32 Engaging hook (Corner engaging portion)
32a Projecting portion
32b Downward extending portion
32c Claw portion
33 Guide protrusion
33a Guide surface
35 Molding bracket
35a Front insertion portion
35b Rear insertion portion
110 Rear side door
111 Door panel
112 Side sash
113 Upper sash
114 Window opening
120 Upper sash molding
121 Belt molding
122 Rear frame molding

The invention claimed is:

1. A frame molding for a vehicle door, including
a first molding portion which is connected to a sash molding attached to a door sash,
a second molding portion which is connected to a belt molding, which is attached to an upper edge of a door panel, and
a corner portion at which said first molding portion and said second molding portion meet,
wherein said frame molding comprises, at said corner portion, a corner engaging portion which is engaged with said door panel to restrict at least upward movement of said corner portion,
wherein said second molding portion is provided with a clip that is configured to engage with said door panel, and
wherein said first molding portion is provided, at an end thereof, with the corner engaging portion that is provided separate from said clip and said corner engaging portion is configured to engage with said door panel, wherein said corner engaging portion comprises a hook which is engaged with an engaging hole formed in a support flange, which projects upward from said upper edge of said door panel.

2. The frame molding for the vehicle door according to claim 1, wherein said corner engaging portion restricts movement of said corner portion in a door thickness direction with respect to said door panel in a state of being engaged with said door panel.

3. The frame molding for the vehicle door according to claim 1, wherein said door panel is formed of a combination of an inner panel which is positioned on an vehicle interior side and an outer panel which is positioned on an vehicle exterior side, and wherein said corner engaging portion is engaged with said outer panel.

4. The frame molding for the vehicle door according to claim 1, wherein said frame molding is formed of a combination of a design member which includes a design portion facing toward a vehicle exterior and a holder portion which holds a weather strip along said door sash, and
wherein said corner engaging portion is provided on said holder member.

5. The frame molding for the vehicle door according to claim 4, wherein said design portion is made of metal, and wherein at least said corner engaging portion of said holder member is made of synthetic resin.

6. The frame molding for the vehicle door according to claim 5, wherein said design member has a length from an end of said first molding portion to an end of said second molding portion, and
wherein a length of said holder member extends from said end of said first molding portion to a middle portion of said second molding portion.

7. The frame molding for the vehicle door according to claim 6, wherein said holder member is configured to extend, as a single member, from an end of said first molding portion to a middle position of said second molding portion.

8. The frame molding for the vehicle door according to claim 1, wherein said clip is configured to engage with said door panel at a flange portion of said door panel, said flange portion formed by folding an upper edge of said door panel, and
wherein said corner engaging portion is configured to engage with said door panel at a support flange projecting upward from an upper periphery of said door panel.

9. The frame molding for the vehicle door according to claim 1, wherein said second molding portion is provided with a body touch lip that extends towards an underside of said corner engaging portion.

10. The frame molding for the vehicle door according to claim 9, wherein when said corner engaging portion engages with said door panel, said body touch lip engages with said door panel.

11. The frame molding for the vehicle door according to claim 1, wherein said corner engaging portion comprises
a projecting portion extending toward a vehicle interior side,
a downward extending portion that is bent downward from said projecting portion, and
a claw portion that is formed by bending an end of said downward extending portion toward a vehicle exterior side.

12. The frame molding for the vehicle door according to claim 11, wherein said claw portion is configured to engage with said engaging hole of said door panel in the vertical direction.

13. The frame molding for the vehicle door according to claim 11, wherein said downward extending portion is configured to contact said support flange in the vehicle width direction.

* * * * *